May 15, 1951  J. BERGESEN  2,553,352
PUMP VALVE UNIT
Filed July 24, 1946
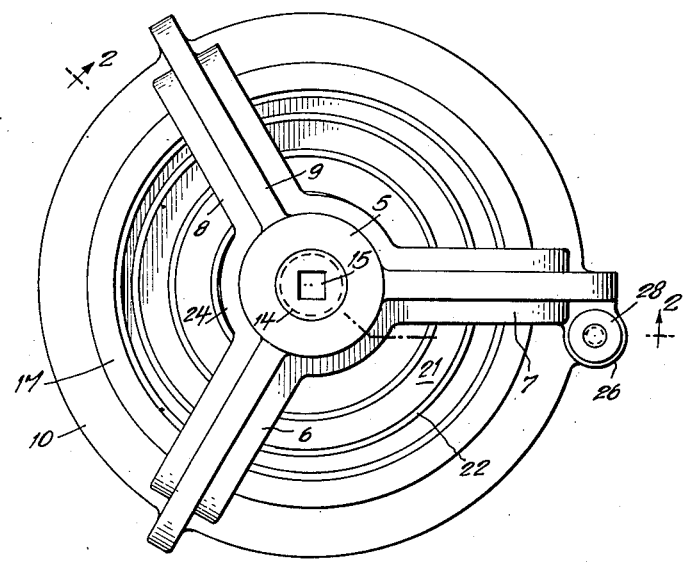
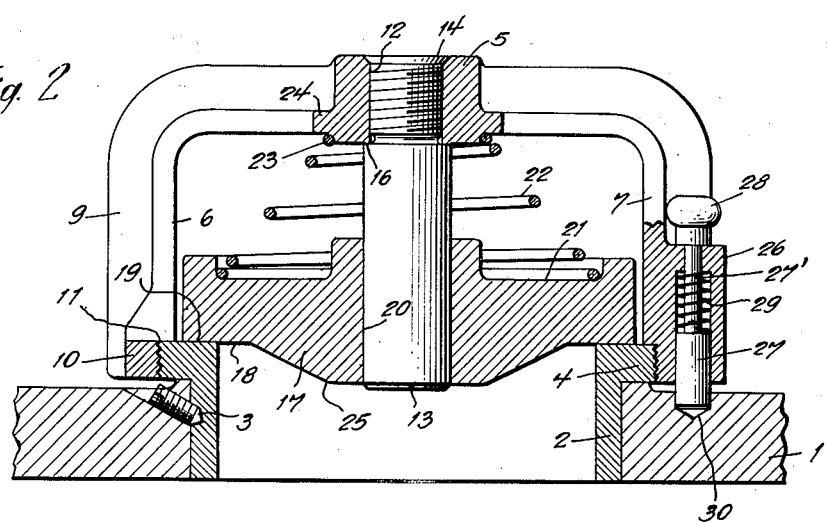
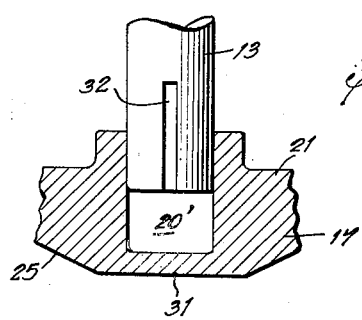
INVENTOR
JUNEUS BERGESEN
ATTORNEY Patented May 15, 1951

2,553,352

UNITED STATES PATENT OFFICE 2,553,352

PUMP VALVE UNIT

Juneus Bergesen, Staten Island, N. Y.

Application July 24, 1946, Serial No. 686,020

3 Claims. (Cl. 251—144)

The present invention is directed to valve structures, more particularly to valves for use in connection with pumps for causing the flow of fluid.

It is desirable in valves of this kind that they provide a minimum of obstruction to the flow of fluid and that they be readily opened and closed by the variations in pressure produced by said pump. It is also highly desirable that the valve and its associated elements be in a single unit which may be readily removed for repair or replacement. Heretofore valves of this type have not had all the characteristics which are desirable and the present invention is intended and adapted to provide a structure of this type which is free from the disadvantages inherent in prior structures of this type.

It is therefore among the objects of the present invention to provide a valve of the disc type which is so mounted that upon the movement thereof from the valve seat, it is adapted to open a relatively large area for the free flow of fluid through the valve opening.

It is also among the objects of the present invention to provide a valve structure which is comprised within a unit, which may be readily placed in position for operation or removed for repair or replacement and which when in operating position is firmly locked against accidental displacement.

It is still further among the objects of the present invention to provide a valve structure which gives a minimum of obstruction to the flow of fluid and which is contained within a relatively confined space.

In practicing the present invention, there is provided a valve seat having a horizontal surface, said seat being secured in an opening in a suitable casing. The outer face of the seat is threaded and an internally threaded ring cooperates therewith. A spider is provided, the free ends of which are secured to the outer face of the ring and the other end of which is provided with a central hub to which a depending guide post is fixed. A flat valve member of suitable material has a central opening to accommodate the guide post and a spring is interposed between the upper face of the valve and the lower face of the hub to bias the valve against the valve seat. The opening in the valve is such that it fits fairly tightly around the post but not sufficiently to cause it to bind in its movements.

In the accompanying drawings constituting a part hereof, and in which like reference characters indicate like parts, Fig. 1 is a top plan view of a form of valve made in accordance with the present invention;

Fig. 2 is a vertical cross-sectional view thereof taken along the line 2—2 of Fig. 1, and Fig. 3 is a fragmentary cross-sectional view of the central part of a modified form of valve disc, some parts being shown in elevation for clearness.

The casing 1 may be of any suitable type of shape and it has an annular opening therein into which is fitted a valve seat 2 which may be fixed in place as by one or more set screws 3. The valve seat may be made of any suitable material such as bronze or the like. The upper part of seat 2 is provided with an annular flange 4 which is threaded at its outer face.

A hub 5 has a spider formed integrally therewith consisting of three legs 6, 7 and 8, the upper ends of which are united with hub 5 and which extend radially outward, spaced 120° apart, and then vertically downward. Each of the legs is provided with a relatively narrow upstanding rib 9 to strengthen and stiffen the legs of the spider. The lower ends thereof are united or integral with ring 10 which is integrally threaded at 11 to cooperate or mesh with the threads on flange 4.

Hub 5 has a central threaded opening 12 intended to serve as a means for holding a depending guide post 13 by means of the threaded upper end 14 thereof. An annular depressed portion 15 is provided in the upper end of guide post 13 to allow the insertion of a suitable wrench for threading the post into the opening. A shoulder 16 is provided so as to bear against the lower end of hub 5 and thus hold post 13 firmly in its operative position.

A valve 17 made of suitable material, such as vulcanized fiber or molded compositions, such as a phenol formaldehyde condensation product and filler, has a lower horizontal bearing surface 18 in contact with the upper bearing face 19 of flange 4. It has a central opening 20 which is of such size as to allow a close fit with post 13 to permit a sufficient amount of clearance so that in operating conditions, valve 17 may move freely up and down without binding on post 13. In the upper face of valve 17 is a recess 21 to accommodate the lower end of coil spring 22, the upper end 23 of which fits against flange 24 of hub 5. Upper end 23 may be fixed in hub 25 to remain as a unit therewith; and if desired, the lower end of spring 22 may be fixed in recess 21. The lower part 25 of valve 17 slopes from the opening 20 upwardly to merge with bearing surface 18, thus providing a guide to direct the flow of fluid into the space between surfaces 18 and 19 and to minimize turbulence and thus facilitate the flow of fluid.

A projection 26 is formed on ring 10, and has a central opening in which latch member 27 is adapted to slide. Said latch has a reduced portion 27' passing through an opening in projection 26, terminating in a knob 28. Spring 29 surrounding said neck tends to hold latch 27 in opening 30 in casing 1.

The operation of the valve is as follows. When assembled and ready to operate, the parts are in the positions shown in Fig. 2. Upon suction or pressure being exerted by the pump in such a direction as to raise valve 17, it slides on post 13 against the compressive action of spring 22 and provides an annular passageway between surfaces 18 and 19. There is very little interference with the flowing due to the fact that the spider has only three relatively narrow legs and a relatively large area is open and unobstructed for the free flow of fluid. The height of the legs of the spider is relatively short but sufficient so that a full opening between the bearing surfaces is obtained. At the same time, because of the relative shortness of the legs, the valve unit may be installed in confined spaces. Upon the reversal of the pump, the action of spring 22 closes valve 17.

When it is desired to remove the valve from the assembly for repair or replacement purposes, no tools are required. The operator grasps knob 28, and raises latch 27 from opening 30. He then grasps the spider and turns the same to remove unthreaded ring 10 from flange 4. If spring 22 is attached to both hub 5 and valve 17, all of the parts in assembled position are simultaneously removed. If the spring 22 is not attached, then it is a simple matter after the spider is removed to lift up the spring and valve. A tool is necessary only in the initial assembly of post 13 on hub 5.

The modification shown in Figs. 1 and 2 is particularly adapted for use in connection with pumps for water, medium and heavy oils and the like. However, where light oils or gas oils are to be pumped, there may be a leakage at the junction of valve 17 and post 13 if they are not properly fitted together. To overcome this possibility, the modification of Fig. 3 is provided. Instead of valve 17 having an opening 20 passing all the way through the valve, there is provided an opening 20' which does not pass all the way through valve 17 but terminates short thereof, leaving a web 31 to close the lower end of the opening. The lower end of post 13 is provided with a longitudinal slot 32 extending upwardly a sufficient distance so that when valve 17 is in its uppermost position, a groove 32 communicates with the outside atmosphere. Thereby any dash pot action is avoided and valve 17 is permitted to move freely up and down post 13.

Although the invention has been described setting forth two embodiments thereof, such embodiments do not limit the invention but are intended to illustrate the same. It is possible to make many variations in the structure within the spirit of the invention. For instance, the materials of construction may be of any type or character suitable for the purpose and other materials than have been specifically set forth above may be used. The function of the spider is primarily to keep the valve in its proper position and the legs thereof may be varied to a considerable degree. For instance, the cross-section need not be an inverted T as shown in Figs. 1 and 2, but may be of streamlined design or tear drop or any other form which will minimize the resistance to the flow of liquid and will also minimize or prevent turbulence. The valve itself may be formed with an upper seating surface equivalent to lower surface 18 and may be otherwise modified so as to allow a reversal of the position of the valve when the lower seat has become unduly worn. At the meeting surfaces of post 13 and opening 20, there may be provided a bushing fixed to the valve of such a material as to prevent wear due to the sliding action of the valve on the post. It may be secured in any desired manner to the valve.

These and other changes in the details of construction will occur to the skilled artisan in this field and therefore the invention is to be broadly construed and not to be limited except by the character of the claims appended hereto.

I claim:

1. A valve unit comprising a casing having a valve opening, an annular seat in said opening and having a smooth cylindrical internal face, said seat having a horizontal flange extending outward from said seat and being secured to said casing and having a flat upper seating surface, the outer face of said flange being threaded, an internally threaded ring meshing with the threads on said flange, a spider having a central hub fixed to said ring, a depending guide post secured in said hub, a valve adapted to contact with said seating surface having a central opening through which said post extends, said post terminating adjacent the under face of said valve when the latter is on said seat, said valve opening being free from obstructions, the central part of the lower face of said valve being below said seat and inclined upwardly towards the edge of said valve to direct fluid past said valve and seat.

2. A valve unit comprising a casing having a valve opening, an annular seat in said opening and having a smooth cylindrical internal face, said seat having a horizontal flange extending outward from said seat and being secured to said casing and having a flat upper seating surface, the outer face of said flange being threaded, an internally threaded ring meshing with the threads on said flange, a spider having a central hub fixed to said ring, a depending guide post secured in said hub, a valve adapted to contact with said seating surface having a central opening through which said post extends, said post terminating adjacent the under face of said valve when the latter is on said seat, said valve opening being free from obstructions, the central part of the lower face of said valve being below said seat and inclined upwardly towards the edge of said valve to direct fluid past said valve and seat, external ribs on the legs of said spider to stiffen the same.

3. A valve unit comprising a casing having a valve opening, an annular seat in said opening and having a smooth cylindrical internal face, said seat having a horizontal flange extending outward from said seat and being secured to said casing and having a flat upper seating surface, the outer face of said flange being threaded, an internally threaded ring meshing with the threads on said flange, a spider having a central hub fixed to said ring, a depending guide post secured in said hub, a valve adapted to contact with said seating surface having a central opening through which said post extends, said post terminating adjacent the under face of said valve when the latter is on said seat, said valve opening being free from obstructions, the central part of the lower face of said valve being below said seat and inclined upwardly towards the edge of said valve to direct fluid past said valve and seat, external ribs on the legs of said spider to stiffen the same, a recess in the upper face of said valve, and a spring between said hub and valve and nesting in said recess.

JUNEUS BERGESEN.

REFERENCES CITED

The following references are of record in the file of this patent:

UNITED STATES PATENTS

| Number | Name | Date |
|---|---|---|
| 575,213 | Cook | Jan. 12, 1897 |
| 647,383 | Miller | Apr. 10, 1900 |
| 666,245 | Ginaca | Jan. 15, 1901 |
| 1,002,938 | Stange | Sept. 12, 1911 |
| 1,086,549 | Miller | Feb. 10, 1914 |
| 1,602,372 | Bullen | Oct. 5, 1926 |
| 1,659,843 | Trottier | Feb. 21, 1928 |
| 1,661,190 | Mead | Mar. 6, 1928 |
| 1,677,357 | McGregor | July 17, 1928 |
| 2,078,553 | Allen | Apr. 27, 1937 |
| 2,131,928 | Abegg | Oct. 4, 1938 |